United States Patent [19]

Norman, Jr.

[11] Patent Number: 5,742,605
[45] Date of Patent: Apr. 21, 1998

[54] SYNCHRONOUS OPTICAL NETWORK USING A RING ARCHITECTURE

[75] Inventor: Charles William Norman, Jr., Overland Park, Kans.

[73] Assignee: Sprint Communications Co., L.P., Kansas City, Mo.

[21] Appl. No.: 203,165

[22] Filed: Feb. 28, 1994

[51] Int. Cl.[6] .......................... H04L 12/50; H04L 12/56
[52] U.S. Cl. .................................................. 370/405
[58] Field of Search ............................. 370/85.5, 85.1, 370/85.12, 85.13, 85.14, 16.1, 16, 401, 402, 404, 405, 406, 407; 340/825.5, 825.05, 827; 371/8.1, 11.1; 359/114, 118, 119, 124

[56] References Cited

U.S. PATENT DOCUMENTS

| | | | |
|---|---|---|---|
| 5,179,548 | 1/1993 | Sandesara | 370/16.1 |
| 5,218,604 | 6/1993 | Sosnosky | 370/85.14 |
| 5,327,427 | 7/1994 | Sandesara | 370/85.14 |
| 5,341,364 | 8/1994 | Marra et al. | 370/16.1 |
| 5,440,540 | 8/1995 | Kremer | 370/16.1 |
| 5,448,389 | 9/1995 | Peacock | 359/119 |

OTHER PUBLICATIONS

"Sonet Improves Fiber–Optic Survivability," *Sprint Technical Report*, Mar. 1993.

Day, Christopher N. et al., "SONET and OSI: Making a Connection," *IEEE LTS*, pp. 52–59, Nov. 1991.

Jakubson, Joel E., "Managing SONET Networks," *IEEE LTS*, pp. 5–13, Nov. 1991.

Eames, Thomas R. et al., "The Synchronous Optical Network and Fiber in the Loop," *IEEE LTS*, pp. 24–29, Nov. 1991.

Ching, Yau–Chau, et al. "Where is SONET?," *IEEE LTS*, pp. 44–51, Nov. 1991.

Haque, Izaz, et al., "Self–Healing Rings in a Synchronous Environment," *IEEE LTS*, pp. 30–37, Nov. 1991.

*Primary Examiner*—Douglas W. Olms
*Assistant Examiner*—Ajit Patel
*Attorney, Agent, or Firm*—Harley R. Ball; Jed W. Craven; Michael J. Setter

[57] ABSTRACT

The present invention is a SONET system for use in large geographic areas, such as areas encompassed by an IXC network, or which are larger than a LATA or a metropolitan area. The system uses self-healing rings which are interconnected. Some of the rings are stacked within the same physical routes in order to minimize the number of ring terminals on each ring.

49 Claims, 6 Drawing Sheets

SYNCHRONOUS OPTICAL NETWORK USING A RING ARCHITECTURE

BACKGROUND

1. Field of the Invention

The invention relates to synchronous optical networks (SONET) and specifically to the use of ring architectures that use stacked rings.

2. Description of the Prior Art

At present, proposed architectures for implementing SONET over relatively large geographic areas are Digital Cross-connect System (DCS) based. The relative size of these areas is larger than a Local Access and Transport Area (LATA), or larger than a metropolitan area. An example of such a network is an Interexchange Carrier IXC).

In FIG. 1, network 10 is depicted without actual connections. For clarity, the network is shown as encompassing a geometric area with short routes, but clearly, networks may span entire countries and continents. Network 10 nodes 20–29 are shown. A node is a site in the network where traffic is processed. Often, this processing involves switching, providing access, and grooming. Additionally, physical routes 30–42 are shown between nodes 20–29. The physical routes do not represent actual connections, but they represent the physical space that the actual connections may occupy. For example, the two lines between nodes 20 and 21 define physical route 30 between nodes 20 and 21. These physical routes are typically optical fibers. Logical connections, or spans, occupy these physical fiber routes. A network will have many more nodes and longer routes than are shown on FIG. 1, but the amount shown is restricted for clarity.

The prior art DCS architecture for SONET deployment in a relatively large network is depicted in FIG. 2. DCS architecture is well-known in the art and is based on point-to-point connections which employ cross-connect switching at the network nodes where point-to-point connections intersect. In FIG. 2, nodes 20–29 and routes 30–42 are again shown as in FIG. 1. In FIG. 2, they are shown connected by DCS switches 50–59 over spans 60–72 occupying physical routes 30–42. The current selection of a DCS architecture for SONET in a relatively large network is dictated by the SONET standards. These standards make rings impractical for these larger networks which encompass areas greater than a LATA or a metropolitan area. ANSI T1.105.XX Series requires that a SONET ring may contain a maximum of only 16 ring terminals.

In the large network environment, this standard puts a severe limitation on the number of ring terminals that may be placed on a ring. A large network, such an IXC, will require hundreds or even thousands of ring terminals to deploy SONET over the large geographic area covered by the network. These large geographic areas are greater than a LATA or a metropolitan area. At only 16 ring terminals per ring, the network is required to implement a high number of rings.

For the IXC deploying SONET, ring terminals will be required at all points of presence (POPs). A POP is where the IXC provides access to its network. Additionally, ring terminals are required at points where switching or grooming capability is located. An IXC network may cover thousands of square miles and contain thousands of POPs, switching, and grooming sites. This requires thousands of ring terminals. For an IXC to comply with SONET standards, the SONET architecture would include a very large number of rings. This is because the thousands of POPs, switching, and grooming sites can only be connected at 16 ring terminals per ring.

The large number of rings coupled with the great geographic distances involved represent a costly amount of overbuild. This overbuild is caused by the fact that ring connections require return spans to complete the ring. The logical connections between ring terminals are called spans. These spans, in turn, require physical fiber routes to complete the ring. At present, a relatively large network is required to add an excessive amount of physical fiber routes to facilitate the high number of spans required to close the large number of rings. The rings must accommodate a large number of POPs, switching, and grooming sites.

In the local environment, this overbuild is not nearly as severe because the geographic areas are restricted within the LATA. As such, the use of ring architectures for SONET has been restricted to small geographic areas such LATAs and individual metropolitan areas. Additionally, networks may employ a single large ring which covers a large area because only one ring must be closed instead of the several rings implicated in large networks.

The large network using rings faces the problem of the extra spans required to close rings, the large number of rings, and the large geographic distances to span. These geographic distances comprise areas larger than a LATA or a metropolitan area. This problem is exacerbated by the constraint of using existing physical routes. If possible, the network tries to re-use its current physical routes in order to avoid having to acquire more physical space for its routes. Real estate costs, as well as, construction and equipment costs are a significant deterrent to acquiring new physical territory for spans. Additionally, due to the terrain problems on long routes, such as mountains, small rings may just not be possible.

The resulting inefficiency has driven the choice to use DCS architecture in the networks larger than LATAs or metropolitan areas. A DCS based network is point to point and requires no return connections. DCS architecture reduces the number of spans required to deploy SONET, and the spans required for DCS adapt well to the existing physical routes. As a result, DCS architecture is the choice at present for large network SONET architectures.

However, there are also problems caused by DCS architectures. DCS survivability is controlled by a centralized device called a Digital Cross-connect Management System (DCMS). The DCMS is well-known in the art. In FIG. 2, DCMS 80 is shown and is connected to DCS switches 40–49 by signaling links 81. When there is an interruption in a DCS network: 1) a DCS switch must sense the interruption, 2) the DCS switch must signal the DCMS of the condition, 3) the DCMS must determine alternate routing, 4) the DCMS must signal the alternate instructions to the DCS switches, and 5) the DCS switches must implement the alternate re-route instructions. At present, this sequence takes several minutes in a large network, such as an IXC. The several minute loss of service is a serious problem.

In contrast, rings may be self-healing. Self-healing SONET rings are detailed in ANSI Standard T1.105.XX Series. Survivability is achieved despite an interruption by routing traffic around the operational side of the ring to complete the connection. No communication with a central control device is needed. No complex re-route instructions need to be determined. This is one reason rings are the choice for networks covering small geographic areas. The small overbuild is offset by the improvement in survivability time. A network can restore service with self-healing rings in milliseconds.

At present, large networks implementing SONET face a dual problem. Ring architectures require grossly impractical overbuild for such a network in order to close the high number of large rings. These are rings which encompass areas larger than a LATA or metropolitan area. The problem is due in part to the SONET standards, the large number of network nodes, and the length of existing physical routes. Although DCS architectures relieve the overbuild problem, the survivability of a DCS based network takes several minutes for a large network. This amount of time is unacceptable. For the above reasons, relatively large networks need a SONET system that does not require impractical overbuild, yet also has millisecond survivability.

SUMMARY

The present invention is a SONET system that satisfies the need of a large network architecture that efficiently complies with the SONET standards and offers acceptable survivability. The SONET system includes SONET ring terminals which are connected by SONET spans to form a ring architecture. The ring architecture does not allow the rings to share ring terminals. Some of the rings individually encompass relatively large geographic areas. These geographic areas are larger than a LATA or a metropolitan area. Particular ring terminals on different rings are connected to provide interconnectivity among the rings. This connection may be a DCS connection. The rings are also self-healing. Self-healing rings provide excellent survivability in a large network. The logical spans of different rings can be stacked within the same physical route in order to limit the number of ring terminals per ring.

The present invention overcomes the problem of implementing a SONET system over a large geographic area by stacking rings. Stacked rings have logical spans that occupy the same physical routes. This allows the rings to be restricted to less than 16 ring terminals per ring, yet still enables the system to accommodate the numerous ring terminals required on the physical routes of a large network. By separating logical spans within the same physical route, inefficient overbuild inherent with large rings is avoided.

BRIEF DESCRIPTION OF THE DRAWINGS

These and other features, aspects, and advantages of the present invention will become better understood with regard to the following description, claims, and drawings where:

DESCRIPTION

The present invention is a SONET system for a relatively large network that uses self-healing rings. These relatively large areas are larger than a LATA or metropolitan area. An example of such a network is an IXC. An additional feature of the invention is that the rings may be stacked. The rings are created by connecting SONET ring terminals with SONET spans and are designed to be self-healing. The ring terminals of different rings are connected to each other to provide interconnectivity among the rings. This connection may be based on DCS equipment. SONET is discussed in the SONET Sprint Technical Report of March 1993.

Figure 1:
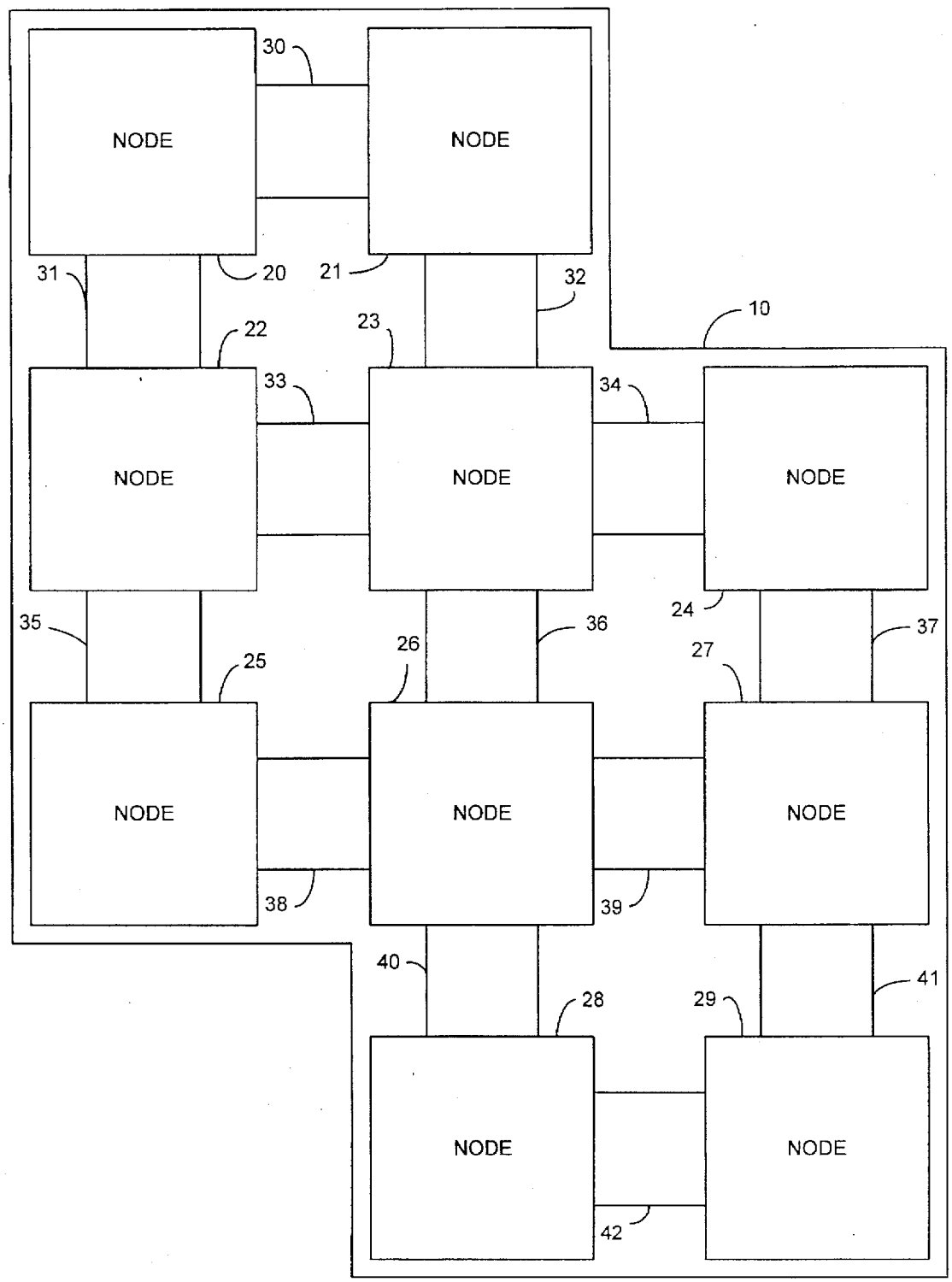
FIG. 1 is a diagram depicting network nodes and physical routes without showing network connections.

In FIG. 1, network 10 is depicted without actual connections. For clarity, the network is shown as encompassing a geometric area with short routes, but clearly, networks may span entire countries and continents. Network 10 nodes 20–29 are shown. A node is a site in the network where traffic is processed. Often, this processing involves switching, providing access, and grooming. Additionally, physical routes 30–42 are shown between nodes 20–29. The physical routes do not represent actual connections, but they represent the physical space that the actual connections may occupy. For example, the two lines between nodes 20 and 21 define physical route 30 between nodes 20 and 21. These physical routes are typically optical fibers. Logical connections, or spans, occupy these physical fiber routes. A network will have many more nodes and longer routes than are shown on FIG. 1, but the amount shown is restricted for clarity.

Figure 2:
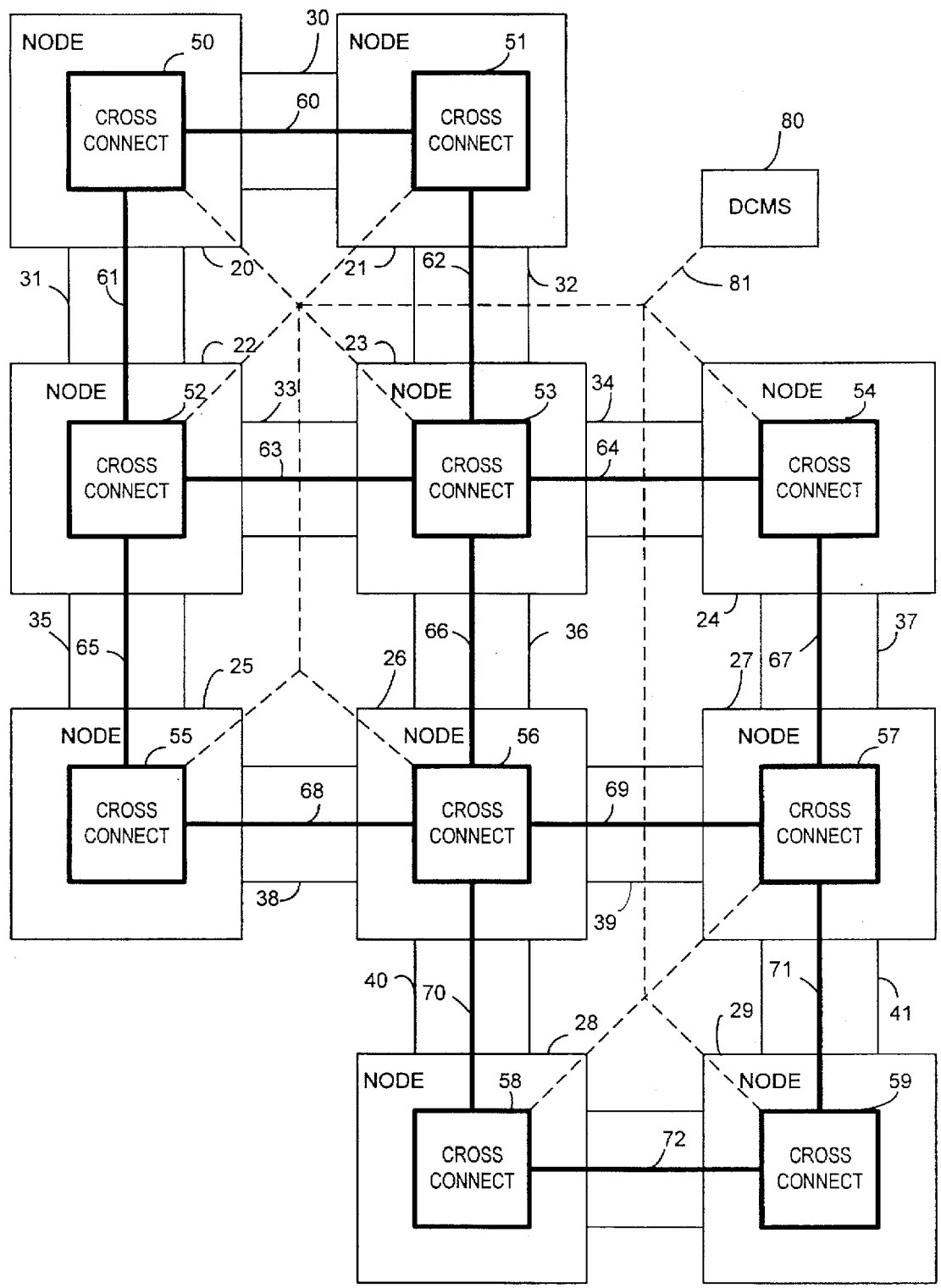
FIG. 2 is a diagram depicting the prior art system using a DCS based architecture.

FIG. 2 illustrates how the nodes 20–29 would be connected over routes 30–42 in a Digital Cross-connect System (DCS) based architecture. FIG. 2 is provided for comparative purposes. DCS connections are point-to-point. They form a grid with DCS switches 50–59 at the intersection points of spans 60–72 which occupy physical routes 30–42. Each DCS switch is capable of switching traffic in any direction, as well as, adding and dropping traffic. These add/drop connections are not shown. The control over the switching is provided by Digital Cross-connect Management System (DCMS) 80. Signalling links 81 is shown between the DCS switches 50–59 and the centralized DCMS 80.

The current selection of a DCS architecture for SONET in a relatively large network is dictated by the SONET standards. These standards make rings impractical for these larger networks which encompass areas greater than a LATA or a metropolitan area. ANSI T1.105.XX Series requires that a SONET ring may contain a maximum of only 16 ring terminals. When a large network deploys a new architecture, it is highly desirable to reuse the existing node sites and physical routes as much as possible due to the costs of land, equipment, and construction. These conditions cause the problems discussed in the background section above.

Figure 3:
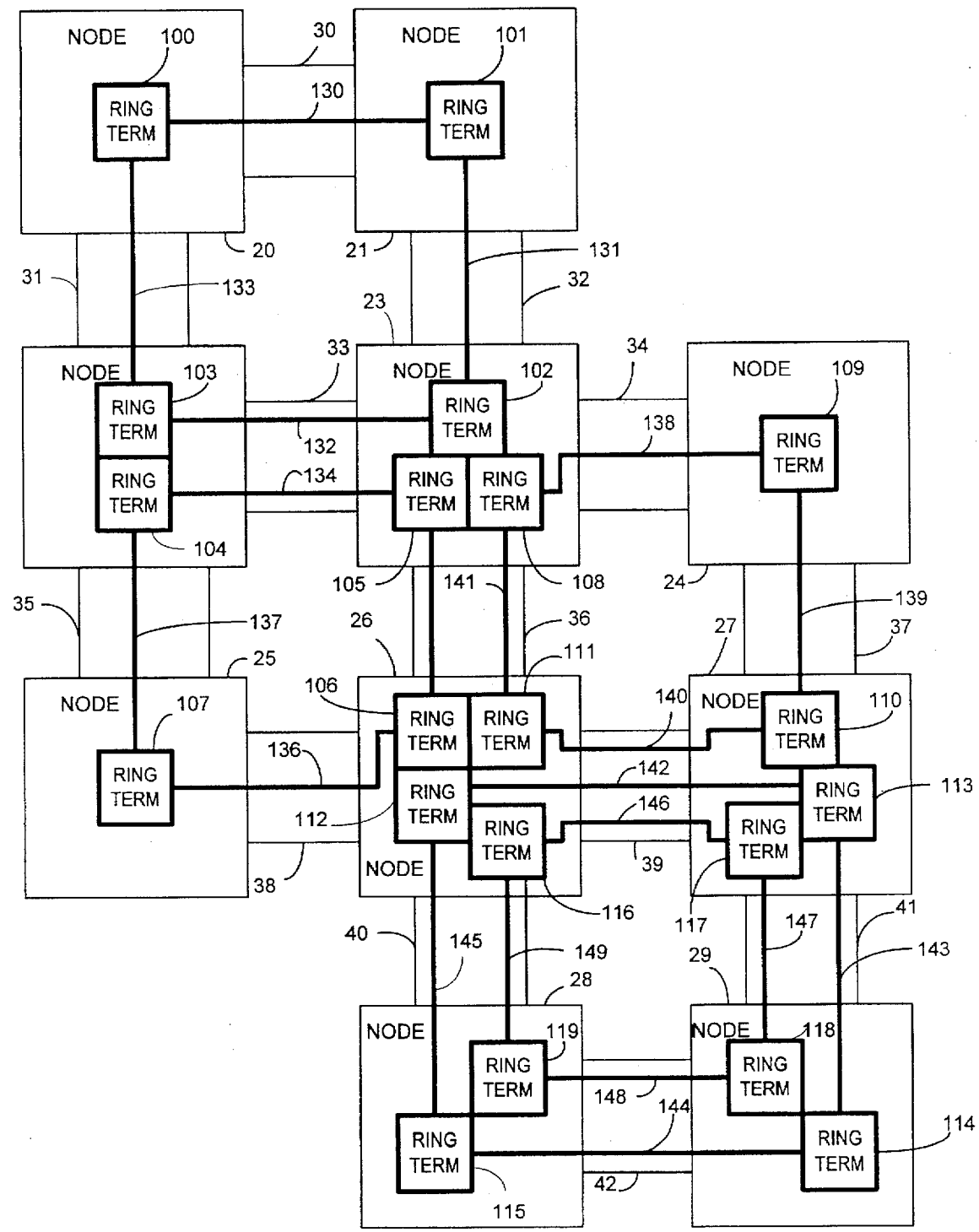
FIG. 3 is a diagram of a version of the present invention depicting a ring architecture.

FIG. 3 shows a version of the present invention. Nodes 20–29 are again shown as a part of the network. SONET ring terminals 100–119 are located at the nodes. Ring terminals 100–119 are comprised of SONET add/drop muxes (ADMs) which are well known in the art. Examples of ADMs are the Alcatel Models 1648SM, 1624SM, and 1612SM which respectively operate at OC-48, OC-24, and OC-12. Each ring terminal is capable of receiving, switching, and transmitting SONET traffic on the connected SONET spans. The ring terminal can add or drop traffic from the SONET rings. These add/drop connections are not shown. The ring terminals also provide grooming for the SONET traffic. These ring terminal capabilities and many others are well known in the art.

SONET spans 130–149 connect the ring terminals. Spans represent logical connections. The operation of SONET transmission using ADMs connected by fiber spans is well known in the art. These spans are logical connections which occupy physical routes, such as optical fibers. Four fiber unidirectional lines are preferred for each span. Other types of fiber lines are known, such as two and four fiber bidirectional or two fiber unidirectional, and even single fiber lines can be used. Dispersion shifted fiber is preferred, but other fiber, such as standard single mode fiber can be used.

In the present invention, the spans interconnect particular ring terminals over physical routes to form rings. As shown in FIG. 3, ring terminals 100–103 are connected by spans 130–133 to form a ring. Other rings are formed by ring terminals 104–107, 108–111, 112–115, and 116–119 which are connected respectively by spans 134–137, 138–141, 142–145, and 146–149.

Spans or groups of spans follow physical routes. These physical routes are typically comprised of optical fibers. The spans represent logical connections within the physical route. On FIG. 3, the same physical routes from FIGS. 1 and 2 are used. As such, route 30 contains span 130. The following is a list of route—span combinations for FIG. 3: route 30—span 130, route 31—span 133, route 32—span 131, route 33—spans 132 and 134, route 34—span 138, route 35—span 137, route 36—spans 135 and 141, route 37—span 139, route 38—span 136, route 39—spans 140 and 142 and 146, route 40—spans 145 and 149, route 41—143 and 147, and route 42—spans 144 and 148.

As stated above, in order to comply with ANSI T1.105.XX Series, each ring is restricted to a maximum of 16 ring terminals. Typically, the network will place more ring terminals on each ring than are shown on FIG. 3, but a smaller number was used for clarity. As a practical matter, each POP, switching, and/or grooming site may require a ring terminal.

When more than 16 ring terminals are encountered, a second ring must be used. In the present invention, the second ring is stacked within the physical route of the first ring in this situation. Rings may be stacked whether or not the 16 ring terminal limit has been reached. Stacked rings maintain separate ring terminals. In FIG. 3, the ring formed by ring terminals 112–115 is stacked on the ring formed by ring terminals 116–119, but the rings share the same physical routes. In that way, the number of ring terminals on a physical route can be increased without increasing the number of ring terminals per ring.

For example, in the above discussed stacked rings (ring terminals 112–119), the total number of ring terminals on the physical route is eight, but the number of ring terminals per ring is four. By stacking more rings within the physical route, the ring terminal per ring ratio can be maintained at four, but the total number of ring terminals on the physical route can be increased.

Figure 4:
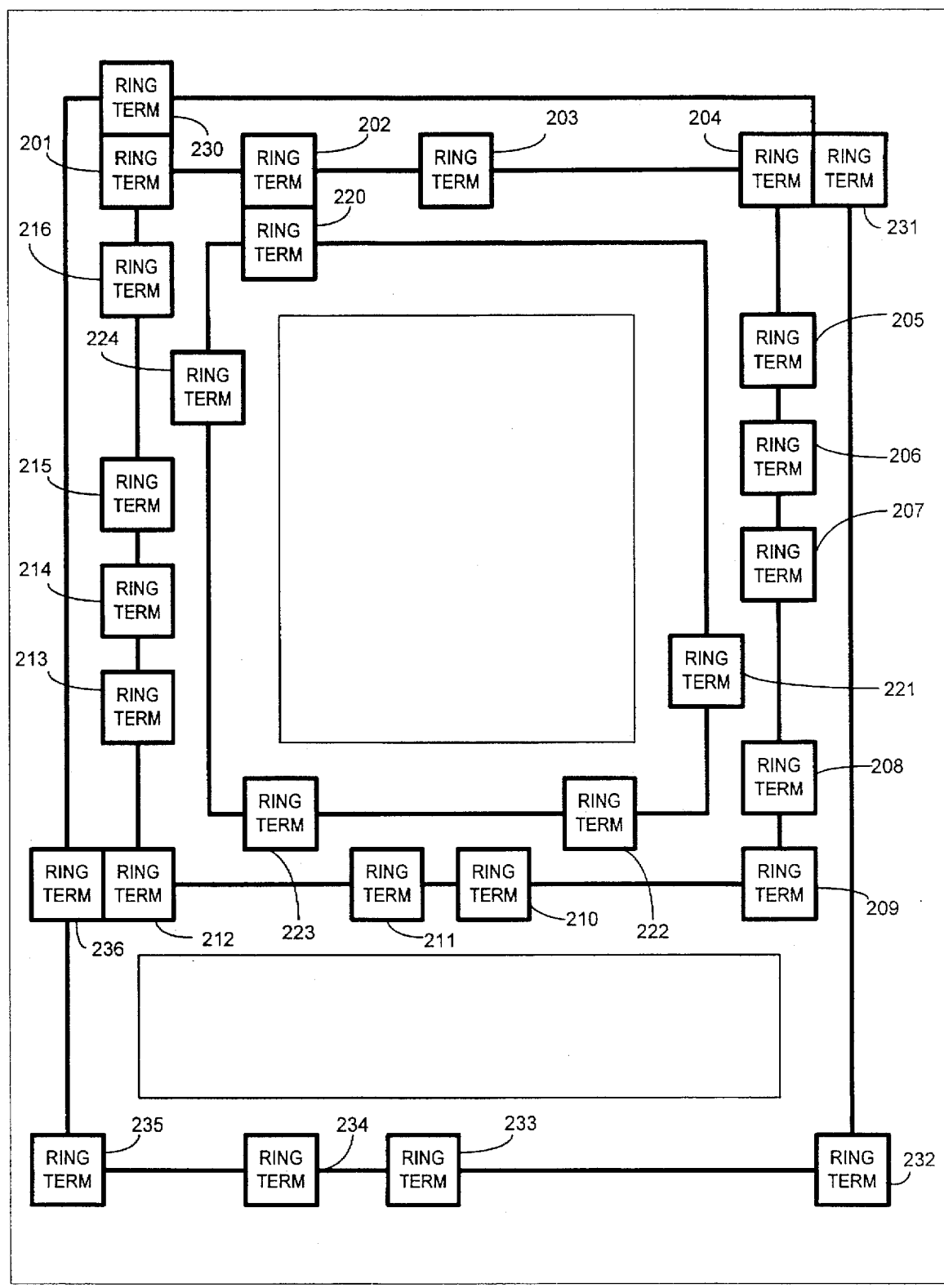
FIG. 4 is a diagram of a version of the present invention depicting stacked rings.

FIG. 4 shows a series of stacked rings. One ring is formed by connecting ring terminals 201–216 with SONET spans. This ring has the maximum 16 ring terminals allowed by the standards. When ring terminals 220–224 are added to the network, a second ring must be added to remain in compliance with the SONET standard. For example, take the existing physical route containing the spans that form a ring with ring terminals 201–216. If new POPs are added along this route, more than the maximum number of 16 ring terminals are required. Thus, new ring terminals 220–224 which service the new POPs must be added to a second ring stacked on the first ring. Stacked rings do not need to be mirror images of one another. The ring formed by ring terminals 230–237 shares only some of the physical route of the other two rings and is only partially stacked. A community of interest ring may share a portion of the physical routes of several rings.

In the preferred embodiment, each span which connects two ring terminals occupies a four fiber unidirectional line. However, spans may occupy other types of lines. Spans may also share the same actual fiber between pairs of ring terminals which are still on different rings. In this case, SONET transmission on the rings is separated on the fiber by using optical couplers or wave division multiplexing (WDM). Optical couplers and WDM are well known in the art. Different rings still may not share ring terminals.

For example, in FIG. 3 ring terminals 103 and 104 are both located at node 22. Ring terminals 102 and 105 are both located at node 23. Ring terminals 102 and 103 are on a ring connected by span 132 over route 33. Ring terminals 104 and 105 are on a different ring connected by span 134 over route 33. Both spans 132 and 134 may occupy the same actual fiber in route 33 by using optical couplers or WDM to separate the rings on the same fiber. As stated, in the preferred embodiment, spans 132 and 134 would each occupy its own four fiber unidirectional line.

This stacking technique can be used to alleviate the amount of fiber required. By allowing different spans to share fiber, new rings may be added to a fiber route to accommodate new ring terminals. Thus by stacking rings within a fiber route, the amount of fiber overbuild required to close rings can be controlled. Preferably, working and protect lines are not placed within the same fiber.

In the present invention, particular ring terminals on different rings will be connected to allow transmission from ring to ring. This connection is preferably a DCS connection, but other connections are possible. Nodes at which different rings are connected are called hubs. Typically, ring terminals at the same node are all on different rings and would be interconnected with a connection to form a hub. For example on FIG. 3, ring terminals 110, 113, and 117 at node 27 would be interconnected. Although the ring terminals at a node do not have to be connected, all ring terminals at the same node preferably are connected. This connection allows the ring terminals on different rings to be connected while maintaining the 16 ring terminals per ring restriction.

Figure 5:
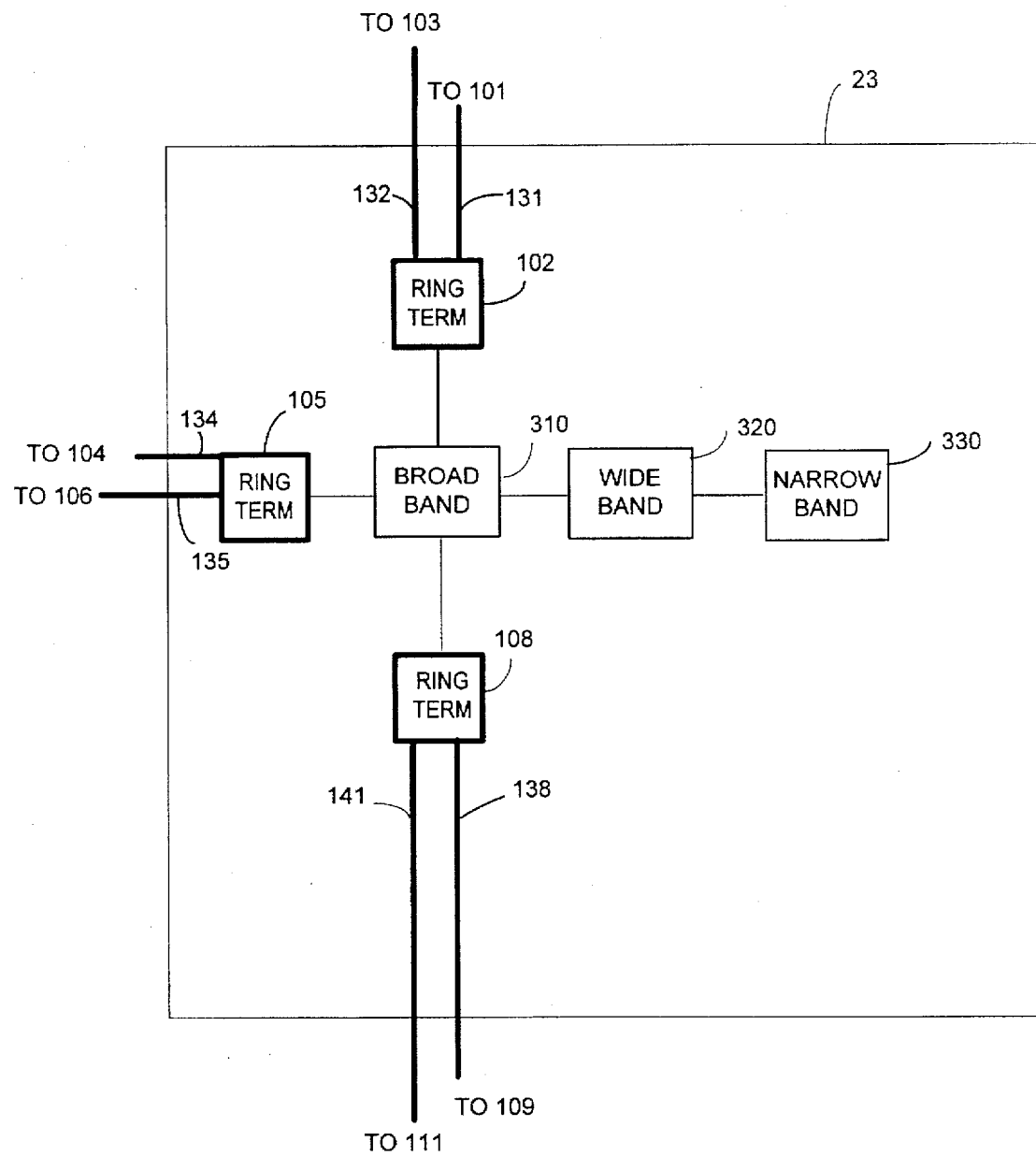
FIG. 5 is a diagram of a version of the present invention depicting a DCS connection.

A DCS connection is shown in FIG. 5. Node 23 connects different rings and includes ring terminals 102, 105, and 108. These ring terminals are connected to other ring terminals at different nodes by spans 131, 132, 134, 135, 138, and 141 respectively as shown on FIG. 3. The add/drop connections of the ring terminals are not shown. On FIG. 5, ring terminals 102, 105, and 108 are interconnected using DCS connections. The DCS connection is comprised of a DCS device or devices with the capability to interface, groom, and switch SONET traffic between ring terminals. The DCS connection can also offer local access.

In the preferred embodiment, this DCS connection is comprised of three connected devices, broadband DCS 310, wideband DCS 320, and narrowband DCS 330. Those skilled in the art appreciate that the capabilities of these devices could be housed in one device or distributed among multiple devices.

Broadband DCS 310 is connected to ring terminals 102, 105, 108, and wideband DCS 320 by standard fiber connections which are preferably four fiber unidirectional lines operating at OC-12. Broadband DCS 310 transmits traffic between the ring terminals. It is designed to handle traffic at or above the DS3 level, and to divert traffic below DS3 to the wideband DCS 320.

Figure 6:
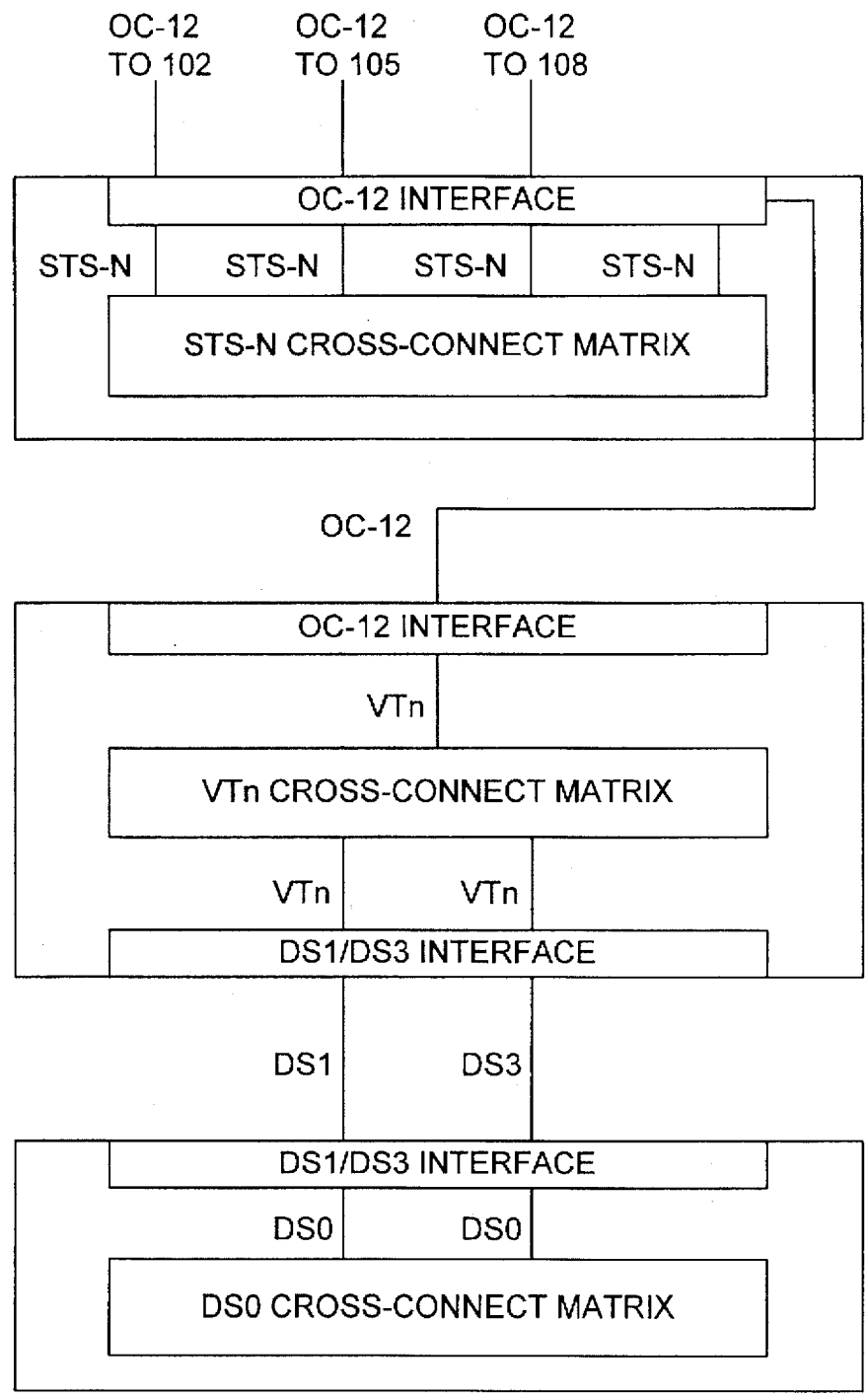
FIG. 6 is a diagram of a version of the present invention depicting a DCS connection.

One version of a DCS connection is shown in FIG. 6. Broadband DCS 310 is shown. An example of broadband DCS 310 is the Alcatel Model 1633SX. Broadband DCS 310 accepts OC-12 lines from the ring terminals. Although only three ring terminals are connected to broadband DCS 310, more ring terminals may be connected. These OC-12 lines are connected to interface 312. Interface 312 breaks down each OC-12 signal into component STS signals. These signals are in turn, connected to cross-connect matrix 314 for grooming. This matrix accepts signals at the STS level or higher, and is capable of establishing a connection from any STS to any other STS using time slot interchange. Typically, these connections are pre-determined and programmed into broadband DCS 310. Although not shown, broadband DCS 310 could accept local access signals into an interface convert these signals into STS signals, and connect them to cross-connect matrix 314 for grooming. As such, broadband DCS 310 could accept SONET signals from both the rings and local sources and connect them.

Wideband DCS 320 is shown. An example of wideband DCS 320 is the Tellabs Model 5500. Wideband DCS 320 accepts the OC-12 signal from broadband DCS 310 into interface 322. These signals are broken down into component VT signals and connected to cross-connect matrix 324 which has the capability to connect any VT to any other VT. Although not shown, local access could also be accepted in a similar manner. Interface 326 accepts a DS1 and a DS3 connection from narrowband DCS 330. Interface 326 maps and grooms these signals into VT signals and connects them to cross-connect matrix 324.

Narrowband DCS 330 is shown. An example of the narrowband DCS is the Digital Switch Corporation Model CS-1L. It accepts the DS1 and DS3 signals from wideband DCS 320 into interface 332. These signals are converted into DS0 signals and connected to cross-connect matrix 334 which has the capability to connect any DS0 to any other DS0. Local access can also be accepted.

Although, the preferred signal levels for interface, grooming, and cross-connection are listed above, those skilled in the art are aware that other choices would be operational. The present invention is not restricted to these listed levels, but they are given as preferred and operational levels. The DCS connection provided by these devices is capable of processing signals transmitted between rings. This processing may occur at different signal levels. The DCS connection also provides local access. In this way, connectivity is provided between the ring terminals of different rings, and to local sources. The DCS connection formed may be any device or combination of devices with the above capabilities. For purposes of redundancy, additional back-up DCS connection capability can be added at a node.

Other connections are also operational in the context of the present invention. In one embodiment, direct cabling at OC-N or STS-N could be used to connect ring terminals on different rings. In another embodiment, an ATM switch with the DCS functionality described could be used to connect the ring terminals of different rings.

At present, SONET standards are driving the choice of OC-12 transmission. This causes a problem since there are no devices currently available that accept, groom, and connect OC-12 traffic between SONET rings. This is another reason that networks have opted for a DCS based architecture. The DCS architecture does not require an OC-12 interface between rings which is currently unavailable. The present invention solves the problem of ring connectivity at OC-12 with the DCS connection.

As stated above, ring architectures solve the problem of excessive survivability time because they can be designed to be self-healing. At present, the benefit of self-healing rings is outweighed in the large network environment because of the impractical overbuild and connectivity problems. However, by stacking rings, and using a DCS connection between rings, the present invention overcomes these problems. As a result, self-healing ring technology can be employed in the present invention to provide significantly improved survivability features.

There are three basic types of self-healing ring methods: path switched unidirectional, line switched two fiber bidirectional, and line switched four fiber bidirectional. Line switched four fiber bidirectional is preferred. These formats for self-healing rings are known in the art, but they have yet to be applied within the large network environment because of the above stated problems with rings in networks larger than LATAs or metropolitan areas. The present invention employs self-healing capability in particular ring terminals on each ring. Problems are avoided by routing the traffic around the operational side of the ring to the destination.

As a result, the present invention provides a SONET system that employs self-healing rings which can efficiently span large geographic distances. Although it is preferred to minimize the size of rings, large rings are inherent to the large network environment. An IXC is an example of a large network, but in the present invention, a network which encompasses an area larger than a LATA or a metropolitan area is considered a relatively large network. Traffic can thus be transmitted from LATA to LATA, or metropolitan area to metropolitan area and maintain millisecond survivability. Current DCS based SONET architectures cannot provide this performance in the large network environment. Current SONET ring architectures are restricted to use in small geographic areas, such as LATAs and metropolitan areas, or to single large rings. By featuring stacked self-healing SONET rings with DCS connections, the present invention eliminates these current problems.

What is claimed is:

1. A SONET system which comprises:
  (a) a plurality of SONET ring terminals;
  (b) a plurality of SONET spans connecting the ring terminals to form an architecture comprising a plurality of rings wherein each ring is comprised of unique ring terminals and spans and is not comprised of any ring terminals and spans of another ring, and wherein particular spans of different rings are stacked within a single fiber route; and
  (c) a plurality of connections between the rings that are operational to provide interconnectivity among the rings.

2. A SONET system which comprises:
  (a) a plurality of SONET ring terminals;
  (b) a plurality of SONET spans connecting the ring terminals to form an architecture comprising a plurality of rings wherein each ring is comprised of unique ring terminals and spans and is not comprised of any ring terminals and spans of another ring, wherein a plurality of the rings individually encompass geographic areas that are large than a LATA, and wherein particular spans of different rings are stacked within a single physical route; and
  (c) a plurality of connections between the rings that are operational to provide interconnectivity among the rings.

3. The SONET system of claim 2 wherein the connections between the rings are Digital Cross-connect System (DCS) connections.

4. The SONET system of claim 3 wherein the DCS connections each comprise a broadband DCS, a wideband DCS, and a narrowband DCS.

5. The SONET system of claim 2 wherein the connections between the rings each comprise at least one ATM switch.

6. The SONET system of claim 2 wherein the connections between the rings are comprised of direct cabling.

7. The SONET system of claim 2 wherein the connections between the rings accept traffic from the ring terminals at OC-12.

8. The SONET system of claim 2 wherein the SONET system forms at least a portion of an Interexchange Carrier (IXC) network.

9. The SONET system of claim 2 wherein the rings are restricted to 16 ring terminals per ring.

10. The SONET system of claim 2 wherein a plurality of the particular spans of different rings are stacked within a single fiber route using wave division multiplexing.

11. The SONET system of claim 2 wherein a plurality of the particular spans of different rings are stacked within a single fiber route using optical couplers.

12. The SONET system of claim 2 wherein a plurality of the spans occupy four fiber unidirectional lines.

13. The SONET system of claim 2 wherein the rings are self-healing rings.

14. A SONET system which comprises:
   (a) a plurality of SONET ring terminals;
   (b) a plurality of SONET spans connecting the ring terminals to form an architecture comprising a plurality of rings wherein each ring is comprised of unique ring terminals and spans and is not comprised of any ring terminals and spans of another ring, wherein a plurality of the rings individually encompass geographic areas that are larger than a metropolitan area, and wherein particular spans of different rings are stacked within a single physical route; and
   (c) a plurality of connections between the rings that are operational to provide interconnectivity among the rings.

15. The SONET system of claim 14 wherein the connections between the rings are Digital Cross-connect System (DCS) connections.

16. The SONET system of claim 15 wherein the DCS connections each comprise a broadband DCS, a wideband DCS, and a narrowband DCS.

17. The SONET system of claim 14 wherein the connections between the rings each comprise at least one ATM switch.

18. The SONET system of claim 14 wherein the connections between the rings are comprised of direct cabling.

19. The SONET system of claim 14 wherein the connections between the rings accept traffic from the ring terminals at OC-12.

20. The SONET system of claim 14 wherein the SONET system forms at least a portion of an Interexchange Carrier (IXC) network.

21. The SONET system of claim 14 wherein the rings are restricted to 16 ring terminals per ring.

22. The SONET system of claim 14 wherein a plurality of the particular spans of different rings are stacked within a single fiber route using wave division multiplexing.

23. The SONET system of claim 14 wherein a plurality of the particular spans of different rings are stacked within a single fiber route using optical couplers.

24. The SONET system of claim 14 wherein a plurality of the spans occupy four fiber unidirectional lines.

25. The SONET system of claim 14 wherein the rings are self-healing rings.

26. A SONET system which comprises:
   (a) a plurality of SONET ring terminals;
   (b) a plurality of SONET spans connecting the ring terminals to form an architecture comprising a plurality of rings wherein each ring is comprised of unique ring terminals and spans and is not comprised of any ring terminals and spans of another ring, wherein a plurality of the rings individually encompass geographic areas that are operational to connect two non-adjacent LATAs on a single ring, and wherein particular spans of different rings are stacked within a single physical route; and
   (c) a plurality of connections between the rings that are operational to provide interconnectivity among the rings.

27. The SONET system of claim 26 wherein the connections between the rings are Digital Cross-connect System (DCS) connections.

28. The SONET system of claim 27 wherein the DCS connections each comprise a broadband DCS, a wideband DCS, and a narrowband DCS.

29. The SONET system of claim 26 wherein the connections between the rings each comprise at least one ATM switch.

30. The SONET system of claim 26 wherein the connections between the rings are comprised of direct cabling.

31. The SONET system of claim 26 wherein the connections between the rings accept traffic from the ring terminals at OC-12.

32. The SONET system of claim 26 wherein the SONET system forms at least a portion of an Interexchange Carrier (IXC) network.

33. The SONET system of claim 26 wherein the rings are restricted to 16 ring terminals per ring.

34. The SONET system of claim 26 wherein a plurality of the particular spans of different rings are stacked within a single fiber route using wave division multiplexing.

35. The SONET system of claim 26 wherein a plurality of the particular spans of different rings are stacked within a single fiber route using optical couplers.

36. The SONET system of claim 26 wherein a plurality of the spans occupy four fiber unidirectional lines.

37. The SONET system of claim 26 wherein the rings are self-healing rings.

38. A SONET system which comprises:
   (a) a plurality of SONET ring terminals;
   (b) a plurality of SONET spans connecting the ring terminals to form an architecture comprising a plurality of rings wherein each ring is comprised of unique ring terminals and spans and is not comprised of any ring terminals and spans of another ring, wherein a plurality of the rings individually encompass geographic areas that are operational to connect two metropolitan areas on a single ring, and wherein particular spans of different rings are stacked within a single physical route; and
   (c) a plurality of connections between the rings that are operational to provide interconnectivity among the rings.

39. The SONET system of claim 38 wherein the connections between the rings are Digital Cross-connect System (DCS) connections.

40. The SONET system of claim 39 wherein the DCS connections each comprise a broadband DCS, a wideband DCS, and a narrowband DCS.

41. The SONET system of claim 38 wherein the connections between the rings each comprise at least one ATM switch.

42. The SONET system of claim 38 wherein the connections between the rings are comprised of direct cabling.

43. The SONET system of claim 38 wherein the connections between the rings accept traffic from the ring terminals at OC-12.

44. The SONET system of claim 38 wherein the SONET system forms at least a portion of an Interexchange Carrier (IXC) network.

45. The SONET system of claim 38 wherein the rings are restricted to 16 ring terminals per ring.

46. The SONET system of claim 38 wherein a plurality of the particular spans of different rings are stacked within a single fiber route using wave division multiplexing.

47. The SONET system of claim 38 wherein a plurality of the particular spans of different rings are stacked within a single fiber route using optical couplers.

48. The SONET system of claim 38 wherein a plurality of the spans occupy four fiber unidirectional lines.

49. The SONET system of claim 38 wherein the rings are self-healing rings.

* * * * *

US005742605C1

(12) EX PARTE REEXAMINATION CERTIFICATE (10849th)

United States Patent
Norman, Jr.

(10) Number: US 5,742,605 C1
(45) Certificate Issued: Apr. 20, 2016

(54) SYNCHRONOUS OPTICAL NETWORK USING A RING ARCHITECTURE

(75) Inventor: Charles William Norman, Jr., Overland Park, KS (US)

(73) Assignee: SPRINT COMMUNICATIONS COMPANY L.P., Kansas City, MO (US)

Reexamination Request:
No. 90/013,476, Mar. 27, 2015

Reexamination Certificate for:
Patent No.: 5,742,605
Issued: Apr. 21, 1998
Appl. No.: 08/203,165
Filed: Feb. 28, 1994

(51) Int. Cl.
*H04L 12/50* (2006.01)
*H04Q 11/04* (2006.01)
*H04J 3/08* (2006.01)
*H04J 14/02* (2006.01)

(52) U.S. Cl.
CPC ............... *H04Q 11/04* (2013.01); *H04J 3/085* (2013.01); *H04Q 11/0478* (2013.01); *H04J 14/02* (2013.01); *H04J 2203/006* (2013.01); *H04J 2203/0041* (2013.01); *H04J 2203/0042* (2013.01)

(58) Field of Classification Search
None
See application file for complete search history.

(56) References Cited

To view the complete listing of prior art documents cited during the proceeding for Reexamination Control Number 90/013,476, please refer to the USPTO's public Patent Application Information Retrieval (PAIR) system under the Display References tab.

*Primary Examiner* — Rachna Desai

(57) ABSTRACT

The present invention is a SONET system for use in large geographic areas, such as areas encompassed by an IXC network, or which are larger than a LATA or a metropolitan area. The system uses self-healing rings which are interconnected. Some of the rings are stacked within the same physical routes in order to minimize the number of ring terminals on each ring.

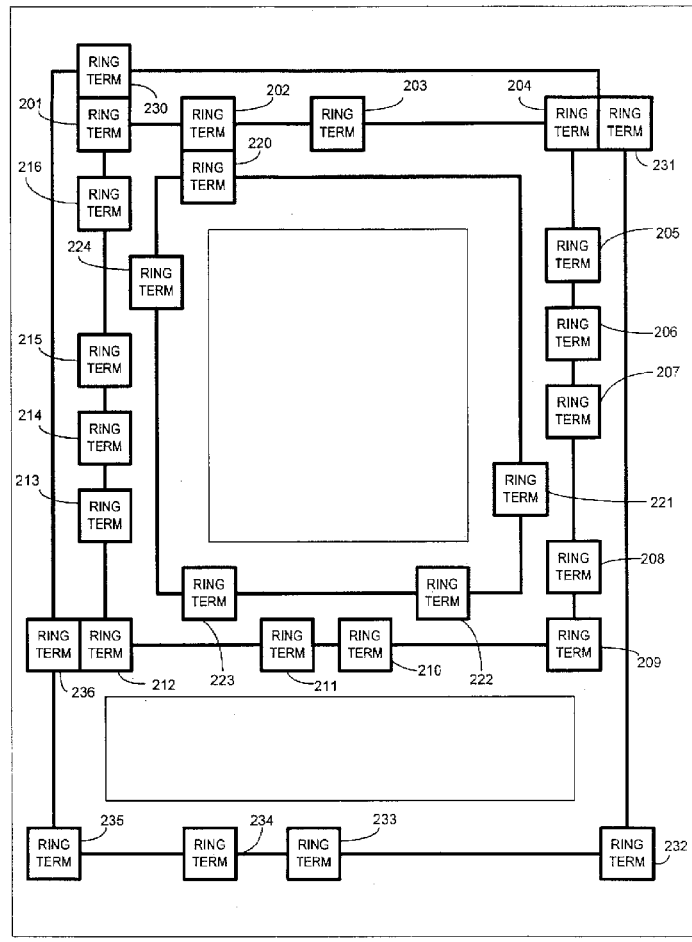

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claim 1 is cancelled.

Claims 2-49 were not reexamined.

\* \* \* \* \*